United States Patent Office 3,573,249
Patented Mar. 30, 1971

3,573,249
POLYMERIZATION OF BUTADIENE
John F. Henderson and Jules Darcy, Sarnia, Ontario, Canada, assignors to Polymer Corporation Limited, Sarnia, Ontario, Canada
No Drawing. Filed June 29, 1967, Ser. No. 649,872
Claims priority, application Canada, July 9, 1966, 965,045
Int. Cl. C08f 1/34, 15/04, 45/28
U.S. Cl. 260—33.6       5 Claims

ABSTRACT OF THE DISCLOSURE

A mixture of butadiene-1,3 and a mono-alkenyl aromatic hydrocarbon such as styrene is polymerized in the absence of diluents or in the presence of butene-2 as the only diluent using a Ziegler type catalyst consisting of e.g. cobalt octoate and aluminum diethyl chloride.

A cis-1,4 polymer of butadiene substantially free of homopolymer of styrene is obtained in the form of a solution in the aromatic hydrocarbon. This solution is polymerized using a free radical initiator to produce an impact resistant thermoplastic composition.

---

This invention relates to a process of producing compositions containing stereospecific polymers of butadiene. In particular, it relates to an improved process of producing impact resistant thermoplastic compositions containing a high cis-1,4 polymer of butadiene.

It is known that cis-1,4 polymers of butadiene can be prepared in solution polymerization using a stereospecific coordination catalyst consisting of e.g. a cobalt salt and aluminum alkyl chloride. Such a polymerization is carried out in the presence of an inert aliphatic or aromatic diluent e.g. butane, butene-1, hexane, benzene. When a polymerizable compound such as isoprene, piperylene or styrene is also present, a copolymer of butadiene is formed having a composition essentially dependent on the relative amounts of butadiene monomer and said polymerizable compound.

It is an object of this invention to provide a process of substantially selectively polymerizing butadiene-1,3 in an alkenyl aromatic medium to produce a stereoregular polymer of butadiene-1,3. A further object is to provide a process of producing an impact resistant thermoplastic composition containing cis-1,4 polymer of butadiene-1,3 by successive steps of first polymerizing predominantly butadiene and then an alkenyl aromatic hydrocarbon.

It has been found that butadiene-1,3 can be substantially selectively polymerized at a reasonable rate in a liquid medium consisting essentially of a mono-alkenyl aromatic hydrocarbon and, if desired, a normally volatile olefin using a catalyst comprising a salt of a Group VIII metal and an aluminum dialkyl chloride to produce a rubbery polymer of butadiene-1,3. The polymer is practically free of homopolymer of said aromatic hydrocarbon, contains not more than a minor proportion of the mono-alkenyl aromatic hydrocarbon copolymerized therewith and has at least 90% of the butadiene units in the cis-1,4 configuration. It also has been found that the product of the above polymerization being a clear solution of cis-1,4 polymer of butadiene in a polymerizable mono-alkenyl aromatic hydrocarbon such as styrene is especially suitable for the preparation of impact resistant thermoplastic compositions.

In accordance with this invention, a process is provided of producing a composition containing a cis-1,4 polymer of butadiene-1,3 which comprises contacting a mixture of butadiene-1,3 and a mono-alkenyl aromatic hydrocarbon with a hydrocarbon-soluble catalyst formed by admixing a salt of a Group VIII metal and an aluminum hydrocarbyl halide, polymerizing said butadiene to produce a cis-1,4 polymer containing not more than a minor proportion of the mono-alkenyl aromatic hydrocarbon copolymerized therewith, deactivating the catalyst and removing the residual butadiene-1,3, whereby a solution of the said polymer of butadiene-1,3, in the mono-alkenyl aromatic hydrocarbon is formed.

In one of the specific embodiments of the invention a process is provided which comprises contacting a mixture of about 30 to 70 parts by weight of butadiene-1,3 and conversely about 70 to 30 parts by weight of a mono-alkenyl aromatic hydrocarbon substantially in the absence of diluents, with a hydrocarbon-soluble catalyst formed by admixing a salt of a Group VIII metal and an aluminum dialkyl mono-chloride, polymerizing said butadiene to produce a cis-1,4 polymer containing not more than a minor proportion of the mono-alkenyl aromatic hydrocarbon copolymerized therewith, inactivating the catalyst, removing the residual butadiene-1,3, whereby a solution of the cis-1,4 polymer of butadiene-1,3 in the mono-alkenyl aromatic hydrocarbon is formed; then polymerizing the said mono-alkenyl aromatic hydrocarbon and recovering an impact resistant thermoplastic composition.

The advantage of the process is that butadiene-1,3 is substantially selectively polymerized from its mixture with a mono-alkenyl aromatic hydrocarbon and if desired, a volatile olefin to produce a high cis-1,4 polymer containing not more than a minor proportion of the mono-alkenyl aromatic hydrocarbon copolymerized therewith. The polymer is gel-free and may be recovered if desired or used as produced in the solution form for the successive polymerization of the mono-alkenyl aromatic hydrocarbon to produce an impact resistant thermoplastic composition.

The monomers used in the process of this invention are butadiene-1,3, and a mono-alkenyl aromatic hydrocarbon such as styrene, vinyl toluene, alpha-methyl styrene, allyl benzene, of which the first one is preferred. The monomers must be dry and free of polar impurities such as alcohols, aldehydes, ketones, phenols, acids. Nonpolar compounds that are normally volatile and practically have no effect on the polymerization of butadiene-1,3 or styrene in the presence of the Group VIII metal salt-aluminum hydrocarbyl halide catalyst can be present in an amount up to about 35 percent by volume of total monomers. They may be introduced as solvents for catalyst components, or as impurities in monomers or are added to reduce the viscosity of the polymer solution. The non-polar compounds include saturated aliphatic hydrocarbons such as butane, hexane, cyclohexane, non-polymerizable olefins such as butene-1, cyclohexene, butene-2, or diolefins such as allene or butadiene-1,2, of which olefins and in particular, butene-2 is preferred. It is preferable that these compounds be volatile at a temperature of about 50° C. so that they can be removed along with the unreacted butadiene from the solution of cis-1,4 polymer of butadiene.

The proportion of butadiene-1,3 to mono-alkenyl aromatic hydrocarbon may vary within wide limits ranging from about 10/90 to about 70/30 on weight basis. The low proportion of butadiene may be used, when it is desired to use the cis-1,4 polymer solution, i.e. the product of the butadiene polymerization, directly for the subsequent polymerization of the mono-alkenyl aromatic hydrocarbon. In view of the depressing effect that the alkenyl aromatic hydrocarbon exerts on the conversion of butadiene-1,3, it is preferred to use a proportion of at least 30/70. The upper limit of the above proportion is determined by the viscosity in the final degassed solution of cis-1,4 polymer. If the solution is to be pumped from one unit to another or transported from one location to another or if the polymer is to be recovered by dispersing the solution in water, it is preferred to maintain the viscosity at a level of about 100 poise or less, and thus the polymer content to about 22%. However, it is not impossible to handle a solution having a viscosity of up to 1000 poise, i.e. such that contains up to about 30% of cis-1,4 polymer of butadiene-1,3 having a Mooney viscosity (ML-4 at 100 C.) of about 50. In view of this limiting concentration of cis-1,4 polymer in the solution, the practical upper proportion of the monomers preferably is 50/50, on weight basis. Higher butadiene charge may be used only when its conversion to polymer is controlled to less than 50%.

The catalyst used in the process of the invention comprises a salt of a Group VIII metal, preferably a cobalt salt, and an aluminum hydrocarbyl halide. Any anhydrous cobalt salt can be used provided that it produces a hydrocarbon-soluble catalyst. It is however preferred to use a cobaltous salt of an organic acid containing about 8 to 18 carbon atoms. Representative examples of such cobalt salts are cobalt octoate, cobalt naphthenate, cobalt stearate, cobalt dodecyl sulphonate, cobalt oleate. The preferred aluminum hydrocarbyl halide is a chloride containing 0.5 to 1.5 atoms of chlorine per atom of aluminum. When styrene or other alkenyl aromatic monomers readily polymerizable with a cationic catalyst are used, an aluminum hydrocarbyl monochloride is employed so that butadiene-1,3 is selectively polymerized in preference to the polymerization of alkenyl aromatic hydrocarbon. The preferable hydrocarbyl radicals are alkyl radicals containing 2 to 8 carbon atoms. Additives that are used in the homopolymerization of butadiene-1,3 in the presence of diluents to modify the cobalt salt-aluminum alkyl chloride catalyst, such as water, alcohol, halogenated hydrocarbon are to be closely controlled or preferably avoided since they depress the selectivity of the catalyst and result in a polymer that is not gel-free. For example, the maximum water amount present in the catalyst system may be about 20 mole percent of the aluminum dialkyl chloride. The ratio of the catalyst components may be varied within wide limits ranging from about 1 mole to as high as 500 moles of aluminum compound per mole of cobalt compound, although it is preferred to use about 20 to 200 moles of aluminum alkyl chloride per mole of cobalt. The concentration of the catalyst with respect to monomer is small and may range from about 1 to 60 millimoles of cobalt compound per 100 parts by weight of the monomer. A practical amount is about 5 to 40 millimoles of cobalt compound per 100 parts of monomers so that the polymerization proceeds at a reasonably fast and controllable rate and produces a polymer of the desired molecular weight. The two catalyst components are preferably added separately and mixed in the presence of monomers in the reactor, although the premixed catalyst may also be used.

The polymerization reaction may be carried out either batch-wise or continuously in a pressure vessel at a temperature below 50° C., preferably at about 0 to 20° C. The vessel should be completely dry and free of oxygen or other reactive impurities affecting either the rate of polymerization or the structure and solubility of the butadiene polymer. The reaction time or the residence time in a continuous system may vary from about 15 minutes to about 20 hours depending on the temperature of polymerization, the amount of catalyst and the impurities present in the system. A reaction time of about 1 to 6 hours to a conversion of about 50% is preferred for a good temperature control. The conversion of butadiene-1,3 to cis-1,4 polymer may vary from 25% to about 75%. Lower conversions are uneconomical, although the polymer is satisfactory in most respects as an elastomer and its solution in alkenyl aromatic hydrocarbon may be used in the production of an impact resistant thermoplastic. The conversions above 75% are not recommended since the reaction proceeds extremely slowly at higher conversion and a polymer is produced containing visible gel particles.

The reaction product of butadiene polymerization is a clear, gel-free, relatively viscous solution of a cis-1,4 polymer of butadiene-1,3 in a mixture containing the alkenyl aromatic hydrocarbon and the residual butadiene monomer. The catalyst is deactivated preferably before any steps are taken to remove volatile ingredients or expose the solution to air and moisture. As the deactivator, a small amount of a polar substance may be used which destroys or firmly completes the aluminum hydrocarbyl halide without forming a protonic acid. Representative polar substances that can be used are ammonia, hydrazines, alcoholates of alkali and alkaline earth metals. Water, acetone and alcohols should be avoided since they promote gelation of butadiene polymer, when added in an amount insufficient to completely deactivate the catalyst. The deactivated solution of butadiene polymer in the alkenyl aromatic hydrocarbon may be handled as any butadiene polymer solution such as produced in conventional solution polymerization systems. It may be treated with an excess of anti-solvent such as ethanol to precipitate the polymer or steam stripped to isolate the polymer in the form of crumb.

The polymer is a solid, elastomeric material of a high molecular weight. The Mooney viscosity (ML-4 at 100° C.) which is a measure of molecular weight of elastomeric polymers may range from 10 to about 100, but is preferably about 25 to 70. The polymer is a copolymer of butadiene containing less than 10% by weight of the monoalkenyl aromatic hydrocarbon copolymerized therewith and having at least 90% and preferably at least 95%, of the butadiene units in the cis-1,4 configuration. There may be additionally present a small amount of not more than 10% of the alkenyl aromatic hydrocarbon polymer in the form of a homopolymer.

When the solution is used for the preparation of thermoplastic material, the residual butadiene monomer and volatile hydrocarbons that may be present in the system, are flashed off, preferably under reduced pressure or slightly elevated temperature, to produce a degassed solution containing about 5 to about 30% of the cis-1,4 polymer of butadiene in alkenyl aromatic hydrocarbon. It may be desirable to reduce the concentration of the rubbery polymer to a level of 1 to 20% by weight and preferably 5-15%, by adding more alkenyl aromatic monomer. Next, a free radical type initiator such as benzoyl peroxide is added in an amount of about 0.01 to 2% by weight of the total solution. Other additives may be added at this point if such are desired in the thermoplastic composition. They include lubricants such as paraffin wax, mineral oil, fatty acid soaps; molecular weight modifiers such as $C_{12}$ or higher alkyl mercaptans; or antioxidants such as alkyl aryl phosphites and/or phenols. The above mixture is then subjected to the polymerization conditions such as are used for the preparation of impact resistant thermoplastic compositions. The most commonly used process is a two stage bulk polymerization system, in which the solution is initially polymerized in an agitated reactor to an about 30% conversion of the alkenyl aromatic hydrocarbon and then completing the polymerization in a series of separate reaction zones maintained at progressively increasing temperatures. The temperature in the agitated vessel is at least 50° C. preferably 60–120° C., whereas in the subsequent reaction zones through which the partially polymerized mixture passes as it is further polymerized, the temperature is maintained at a range between 120 and 250° C. The temperature is increased as the conversion of the alkenyl aromatic hydrocarbon is increased so as to maintain the polymerization at a high rate up to practically complete conversion.

The thermoplastic composition produced by this process is an impact-resistant material suitable for use in the production of e.g. compression moulded goods.

The invention is further illustrated in the following examples:

EXAMPLE 1

Butadiene-1,3 was polymerized in the presence of styrene as the diluent using a cobalt octoate-aluminum diethyl monochloride catalyst. The polymerization recipe was as follows:

Butadiene-1,3—Variable
Styrene—Variable
Butadiene-1,2—0.025 milliliter
$H_2O$—0.002 milliliter
Cobalt octoate—0.0013 gram
Aluminum diethyl chloride—0.105 gram Plastic grade styrene of at least 99.5% purity and special butadiene having a purity of 99.4% or more were each dried over activated alumina and molecular sieves. Styrene was charged first by syringe into 7 ounce crown capped pressure bottles that had been thoroughly dried and purged with dry nitrogen. Liquid butadiene was then pressured by nitrogen from a calibrated charge vessel through a syringe needle into capped bottle. The catalyst modifiers, butadiene-1,2 and water, were charged in the form of solutions in styrene. The catalyst components were then injected, cobalt octoate as a 1% solution in benzene and aluminum diethyl chloride as a 20% solution in hexane. Three bottles were charged and agitated at room temperature for a period of time while butadiene-1,3 polymerized. The recipe variables and the results of the polymerization are shown in Table I.

TABLE I

| Bottle Number | 1 | 2 | 3 |
|---|---|---|---|
| Total styrene charge (mls.) | 10 | 8 | 6 |
| Butadiene-1,3 charge (mls.) | 10 | 12 | 14 |
| Butadiene-1,3 proportion (percent by vol.) | 50 | 60 | 70 |
| Polymerization time (hours) | 16 | 1 | 1 |
| Polymer yield (grams) | 3.1 | 2.6 | 2.8 |
| Polymer characteristics: | | | |
| Styrene content (percent by wt.): | | | |
| Total—as determined by I.R. | 7.4 | 2.8 | 2.5 |
| In random copolymer as determined by NMR | Ca. 2 | Ca. 2 | Ca. 2 |
| Cis-1,4 polybutadiene (mole percent on total Bd.) | 94.8 | 93.0 | 93.6 |
| Intrinsic viscosity (dl./g.) | 1.12 | 1.39 | 1.54 |
| Solubility in toluene (percent) | 100 | 100 | 100 |

A clear viscous solution was obtained in these bottles. The solution was treated with about 20 mls. of ethanol to precipitate polymer. The solid polymer was isolated; washed with further ethanol, dried and weighed.

It was then checked for intrinsic viscosity and solubility in toluene at 30° C. and the composition was determined by means of infra-red spectrophotometry (I.R.) and nuclear magnetic resonance (NMR). The total styrene content in the polymer and the percentage of butadiene units in the cis-1,4 configuration was determined from I.R. spectra, while the amount of styrene bound in the form of a random copolymer with butadiene was estimated from NMR.

The results in Table I indicate that in all three bottles a copolymer was formed containing about 2% by weight of styrene randomly copolymerized with butadiene and that 93.0–94.8% of butadiene units in the copolymer were in the cis-1,4 configuration. They also show that the polymeric product contained variable amounts of polystyrene from about 5% by wt. for bottle 1 to practically nil for bottle 3.

By comparison, when the experiment of bottle 1 was repeated with aluminium diethyl chloride replaced by aluminium ethyl dichloride and a mixture of chloride and dichloride corresponding to the formula $$Al(ethyl)_{1.67}Cl_{1.33}$$

respectively, the polymerization reaction proceeded very rapidly, the conversion of about 70% forming a viscous solution with large volume of swollen gel. The polymer was found to be a polystyrene essentially free of butadiene units.

An additional experiment was made using a different monomer ratio in the following recipe:

Butadiene-1,3—2 ml.
Styrene—18 ml.
Cobalt octoate—0.0013 gram
$Al(ethyl)_{1.67}Cl_{1.33}$—0.078 gram 8.0 gm. of polymer was produced in 16 hours at room temperature. The polymer was essentially polystyrene and contained 2.2% by weight of highly swollen gel.

The above results indicate that in the presence of aluminium diethyl chloride butadiene substantially selectively polymerizes to produce a gel-free copolymer containing about 2% of styrene randomly copolymerized.

EXAMPLE 2

Four bottles were charged using the recipe of Example 1, bottle 3. They were agitated at room temperature for one hour while about 30% of butadiene-1,3 polymerized to form a clear solution. 15 ml. of styrene containing various stopping agents were admixed next and then, the residual butadiene monomer was removed by applying a vacuum of about 500 mm. Hg at room temperature. The resulting polymer solution in styrene was diluted with 20 ml. of a 2.5% solution of benzoyl peroxide in styrene and 10 ml. of pure styrene and the bottles were then placed in hot water bath of 65° C. and 80° C., respectively, and agitated overnight, for 16 hours, to polymerize styrene. The various stopping agents used, polymerization results and observations are recorded in Table II.

TABLE II

| Bottle | 1 | 2 | 3 | 4 |
|---|---|---|---|---|
| Stopping agents | (1) | (2) | (3) $NH_3$ | (3) $NH_3$ |
| Antioxidant [4] (gms.) | 0.03 | 0.03 | 0.03 | Nil |
| Appearance of the solution after stopping | (5) | (6) | ———→ | |
| Temperature of styrene polymerization (° C.) | 65 | 65 | 80 | 80 |
| Conversion of styrene to polymer (percent) | 100 | 0 | 100 | 100 |

[1] 3 mls. of acetone.
[2] 3 mls. of acetone and 3 mls. of ethylene diamine.
[3] Styrene was saturated with dry $NH_3$ at a pressure of 0.7 kg./cm².
[4] 2,6-di-tertiary butyl 4-methyl phenol.
[5] Gelled.
[6] Clear, no gel.

The polymer solution of bottle 1 gelled almost immediately after the addition of 15 ml. of styrene solution of acetone and antioxidant. Similar observations were made in separate experiments when acetone was replaced by methanol or water. Gel, however, did not interfere with the polymerization of styrene as it polymerized to a milky thermoplastic material.

Gel-free solutions of polybutadiene which are preferred for the production of impact resistant thermoplastic composition were prepared in bottles 2 to 4 by stopping the polymerization with ethylene diamine or ammonia. Ammonia was preferred since it did not interfere with the subsequent polymerization of styrene in the presence of benzoyl peroxide. The product in bottles 3 and 4 was an opaque thermoplastic material, solid at room temperature and relatively viscous at the temperature of 80° C.

EXAMPLE 3

Butadiene was polymerized in 30 ounce crown-capped pressure bottles in the presence of styrene and butene-2 using the following recipe:

Styrene—100 ml.
Butene-2—100 ml.
Butadiene—102 ml.
Water (charged with styrene)—0.005 and 0.008 ml., respectively
Cobalt octoate—0.09 gm.
Aluminum diethyl chloride—0.21 gm.

Butene-2 was 98.7% pure with butene-1 being the main impurity. The charging and polymer recovery procedure was as described in Example 1. Three bottles were charged and the polymerization was carried out at 22° C. for 1 hour after which time 10 ml. of 1% solution of 2,6-ditertiary butyl 4 methyl phenol in acetone was injected to stop the reaction. The results are shown in Table III.

TABLE III

| Bottle | 1 | 2 | |
|---|---|---|---|
| Water (mls.) | 0.005 | 0.008 | 0.008 |
| Benzene (gms.) [1] | 9 | 9 | Nil |
| Conversion (percent of butadiene) | 32.7 | 27.4 | 29.5 |
| Intrinsic viscosity (dl./g.) | 1.86 | 2.49 | 2.40 |
| Mooney (M/L 4' at 100) | ([2]) | 42 | 34.5 |
| Polystyrene content (percent of total polymer) | 0.2 | 3.4 | ([3]) |

[1] Used as a solvent for cobalt octoate; bottle 3 was charged with the cobalt octoate dissolved in n-hexane.
[2] Not tested.
[3] Traces.

The results in the above table indicate that a polybutadiene practically free of polystyrene was produced in the absence of benzene and at the low water charge respectively. Butene-2 and the residual butadiene was easily removed by flashing at room temperature and slightly reduced atmospheric pressure and a clear solution of polybutadiene in styrene was obtained.

What is claimed is:

1. A process of producing a composition containing a cis-1,4 polymer of butadiene-1,3 which comprises contacting a mixture consisting essentially of butadiene-1,3 and a mono-alkenyl aromatic hydrocarbon mixed in a weight proportion from about 10/90 to about 70/30 in the presence of up to about 35 percent by volume of total monomers of butene-2 with a hydrocarbon soluble catalyst solution formed by admixing a cobalt salt of an organic acid containing about 8 to 18 carbon atoms, an aluminum hydrocarbyl monochloride and not more than about 20 mole percent of water, based on aluminum hydrocarbyl monochloride, said catalyst being in an amount from about 1 to 60 millimoles of cobalt salt per 100 parts by weight of monomers, selectively polymerizing said butadiene, deactivating said catalyst and removing volatile components containing residual butadiene-1,3 to produce a gel-free solution of cis-1,4 polymer of butadiene-1,3 in said mono-alkenyl aromatic hydrocarbon, said polymer containing less than 10% of polymerized units of monoalkenyl aromatic hydrocarbon.

2. The process according to claim 1 in which the solution of the cis-1,4 polymer of butadiene-1,3 in the mono-alkenyl aromatic hydrocarbon is polymerized in the presence of a free radical initiator.

3. The process according to claim 2 in which said solution contains about 5–30% of the cis-1,4 polymer.

4. The process according to claim 2 in which the mixture is contacted with the catalyst at a temperature below 50° C. and then the resulting solution is polymerized substantially to completion in the presence of a free radical initiator at a temperature of at least 50° C.

5. The process according to claim 1 in which the mono-alkenyl aromatic monomer is styrene.

References Cited

UNITED STATES PATENTS

| 3,068,180 | 12/1962 | Van Amerongen | 260—84.1 |
| 3,135,725 | 6/1964 | Carlson et al. | 260—84.1 |
| 3,183,204 | 5/1965 | Engel | 260—84.1 |
| 3,299,178 | 1/1967 | Short et al. | 260—880 |
| 3,462,406 | 8/1969 | Natta et al. | 260—94.3 |

JAMES A. SEIDLECK, Primary Examiner

U.S. Cl. X.R.

260—84.1, 880